US008386954B2

(12) United States Patent
San Jule et al.

(10) Patent No.: US 8,386,954 B2
(45) Date of Patent: Feb. 26, 2013

(54) INTERACTIVE MEDIA PORTAL

(75) Inventors: Todd San Jule, Woodinville, WA (US); William H. Vong, Hunts Point, WA (US); Mark G. Young, Cedar Park, TX (US); Randy Siu, Los Angeles, CA (US); Philippe J. Scoffie, Santa Monica, CA (US); Adriana Tavares Torresan, Burbank, CA (US); Joseph S. Paguirigan, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 12/276,248

(22) Filed: Nov. 21, 2008

(65) Prior Publication Data
US 2010/0131977 A1    May 27, 2010

(51) Int. Cl.
H04N 5/445    (2006.01)
(52) U.S. Cl. ......................................... 715/781; 725/37
(58) Field of Classification Search .................. 715/781; 725/31
See application file for complete search history.

(56) References Cited

U.S. PATENT DOCUMENTS

| | | | |
|---|---|---|---|
| 6,141,007 A | | 10/2000 | Lebling et al. |
| 7,386,874 B2* | | 6/2008 | White et al. ................... 725/134 |
| 7,681,128 B2* | | 3/2010 | Yamamoto et al. ........... 715/717 |
| 7,801,419 B2* | | 9/2010 | Sakai et al. .................... 386/241 |
| 7,827,298 B2* | | 11/2010 | Black et al. .................... 709/231 |
| 7,839,385 B2* | | 11/2010 | Hunleth et al. ................ 345/158 |
| 2001/0039658 A1 | | 11/2001 | Walton |
| 2002/0010928 A1 | | 1/2002 | Sahota |
| 2002/0069286 A1 | | 6/2002 | Yu |
| 2004/0078814 A1* | | 4/2004 | Allen ............................... 725/47 |
| 2004/0148633 A1 | | 7/2004 | Skinner et al. |
| 2004/0165010 A1* | | 8/2004 | Robertson et al. ............. 345/805 |
| 2004/0249965 A1* | | 12/2004 | Huggins et al. ................ 709/231 |
| 2005/0028197 A1* | | 2/2005 | White et al. .................... 725/38 |
| 2005/0193015 A1* | | 9/2005 | Logston et al. ............. 707/104.1 |
| 2006/0026088 A1 | | 2/2006 | Grossman et al. |
| 2006/0206803 A1 | | 9/2006 | Smith |
| 2007/0160345 A1* | | 7/2007 | Sakai et al. ...................... 386/95 |
| 2007/0266411 A1* | | 11/2007 | Yamamoto et al. ............. 725/88 |
| 2007/0294238 A1 | | 12/2007 | Citron et al. |
| 2008/0040453 A1* | | 2/2008 | Cohen ........................... 709/219 |
| 2008/0098101 A1* | | 4/2008 | Black et al. .................... 709/223 |
| 2008/0163318 A1 | | 7/2008 | Chen et al. |
| 2008/0189653 A1* | | 8/2008 | Taylor et al. ................... 715/792 |
| 2008/0195701 A1 | | 8/2008 | Venkatsubra et al. |
| 2009/0187859 A1* | | 7/2009 | Tuerk et al. .................... 715/834 |
| 2010/0150525 A1* | | 6/2010 | Walker ............................. 386/69 |
| 2011/0023068 A1* | | 1/2011 | Zeldis et al. ..................... 725/61 |

OTHER PUBLICATIONS

YES Launches Interactive News Portal Using NDS Technology, Indiantelevision.com's TV Technology Update, Mar. 26, 2003, http://www.indiantelevision.com/tec/y2k3/mar/martec17.htm.

\* cited by examiner

*Primary Examiner* — Tuyetlien Tran
*Assistant Examiner* — Jessica Chuang
(74) *Attorney, Agent, or Firm* — Vierra Magen Marcus & DeNiro LLP (57) ABSTRACT

Techniques are disclosed herein for a media center portal. One implementation includes displaying first content in an expanded state and second content in a contracted state. At least a portion of the first content is presented in a viewport. A request is received to expand the second content. The first content is contracted for display in the contracted state. The second content is expanded for display in the expanded state. The contracted first content is displayed while displaying the expanded second content. At least a portion of the second content is presented in a text reader when in the expanded state.

12 Claims, 10 Drawing Sheets

INTERACTIVE MEDIA PORTAL

BACKGROUND

There are a variety of sources from which a consumer may obtain news, media entertainment, and other information. For example, a user may watch local or national news on a television set or access the Internet to track breaking news or obtain stock quotes. The user might also watch popular videos that are streamed from the Internet.

However, if the user is watching the local news it can be quite cumbersome to check her stock quotes on the Internet during the commercial break. For example, she might get up from the couch where she was watching the local news and logon to her computer to check her stock quotes; however, this is cumbersome. This is just one example of the difficulty in accessing multiple different media sources contemporaneously.

SUMMARY

Techniques are disclosed herein that provide a one-stop media center portal for today's media consumer. In one implementation, the media center portal combines broadcast TV, streaming video, Internet news stories, stock quotes, and weather reports. The media portal can be especially effective for news consumers, but is not so limited. In one implementation, the media portal presents separate regions on a display screen for a video, news articles, and information tracking (e.g., stocks, weather). One of the regions shows an expanded version of the content; the other regions display contracted versions of the content. For example, if the user is reading a news article, a text reader containing the article is presented in one region and a small version a viewport and minimal tracking information are presented in other regions. If the user wishes to focus on stock quotes or the weather, the user can cause the tracking information to be expanded, which may cause the text reader to be removed. In one implementation, by using arrow keys on a remote control the user moves the content to a different region of the screen where it is expanded (or contracted). However, a keyboard or other device can be used to move content.

One aspect is a method of providing a media center portal. First content is displayed in an expanded state and second content in a contracted state. At least a portion of the first content is presented in a viewport. A request is received to expand the second content. The first content is contracted for display in the contracted state. The second content is expanded for display in the expanded state. The contracted first content is displayed while displaying the expanded second content. At least a portion of the second content is presented in a text reader when in the expanded state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
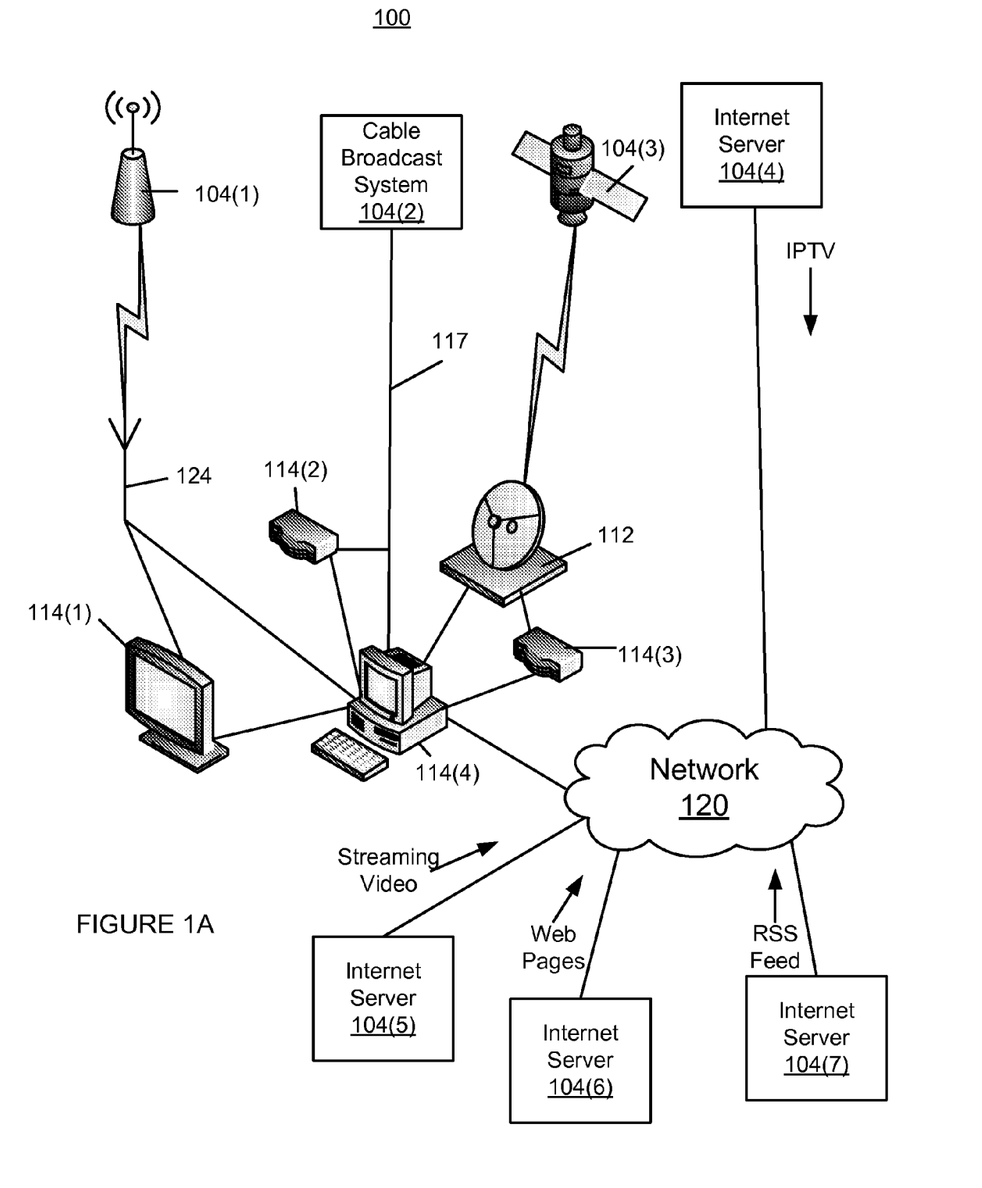
FIG. 1A illustrates an exemplary system in which various embodiments described herein can be implemented.

FIG. 1A illustrates an exemplary system 100 in which various embodiments described herein can be implemented. System 100 includes multiple media sources 104(1)-104(7) and multiple client devices 114(1)-114(4) connected to the media sources 104. Some, though not necessarily all of the sources 104, are capable of providing video such as streaming video and television. For example, local television antenna 104(1), cable broadcast system 104(2), satellite 104(3), and content server 104(4) are all capable of providing video in the form of a television broadcast signal. The local television antenna 104(1) may be used to transmit a signal from a local television station. The cable broadcast system 104(2) provides a television signal from a cable television provider. The satellite 104(3) provides a television signal from a satellite television provider. The content server 104(4) provides a television signal from an Internet Protocol television provider. Note that a television signal is capable of carrying a wide variety of information such as television programs, movies, commercials, etc. The video content is not limited to a television broadcast signal. For example, internet server 104(5) provides streaming video that is not associated with a television broadcast.

Some, though not necessarily all of the sources, are capable of providing textual content. For example, the content server 104(6) may be an Internet server that provides web pages containing news articles. Note that a web page (or other document) that contains a news article may have an image that accompanies the article. The document may also have graphics such as a chart. At least one of the sources is able to provide real time information such as stock quotes and weather reports. For example, the content server 104(7) may provide an RSS (Really Simple Syndication) feed to provide the latest stock quotes. FIG. 1 presents only a few example media sources 104.

Client devices 114 can be implemented in a number of ways. For example, client device 114(1) is connected to an antenna 124 to receive media content from a local television station. In this example, client device 114(1) is a television set, which can receive content from other clients 114(2)-114(4). Client 114(1) may have a direct connection to clients 114(2) and 114(3) to receive the media content; however, those connections have not been depicted in FIG. 1 so as to not obscure the diagram. In one embodiment, the system 100 includes a television set that does not have a tuner.

Client device 114(2) is connected to a cable network 117 to receive media content from a cable system 104(2). Client device 114(2) is also referred to as a set-top box. Client device 114(3) is coupled to a satellite dish 112 to receive media content from the satellite 104(3). Client device 114(3) may also be referred to as a set-top box or a satellite-receiving device. Client device 114(4) is connected to a network 120 (e.g., the Internet) to receive media content from servers 104(4)-104(7). The client device 114(4) can also receive media content from a network source that is not on the Internet. Client device 114(4) may also be referred to as a personal computer. The client devices 114(1)-114(4) may have one or more tuners to tune to signals to extract the content.

The personal computer 114(4) can receive the media content in a variety of ways. In one embodiment, the personal computer 114(4) has a tuner card to allow the personal computer 114(4) to directly receive a broadcast signal. The tuner card may be installed inside the computer 114(4) by connecting the tuner card to, for example, a peripheral component interface (PCI) expansion slot. Alternatively, the tuner card can be external hardware that is connected to the computer 114(4) by a Universal Serial Bus (USB) cable or the like. A tuner card can be connected to the antenna 124, cable connection 117, and satellite dish 112, as examples.

However, the computer 114(4) (or other client 114) does not require special hardware such as a tuner card to receive television from a network based broadcaster via content server 104(4), which provides IPTV. An example of a network broadcaster is the American Broadcasting Corporation (ABC) providing "Internet Television" from a web site. Numerous vendors provide software programs for receiving Internet Television. An example of such a software product is the Microsoft® Mediaroom™ Internet Protocol Television (IPTV) software platform, which is commercially available from Microsoft Corporation of Redmond, Wash.

Note that the personal computer 114(4) can also be connected to other client devices 114(1)-114(3) to allow the personal computer 114(4) to receive media content from the tuners in the other devices 114(1)-114(3). For example, the personal computer 114(4) can be connected to either of the set top boxes 114(2), 114(3) to receive an output single therefrom. The personal computer 114(4) executes software to process the signals output from clients 114(2) or 114(3) to play television programs, etc. on the personal computer 114 (4). An example of such software is the Media Center™ entertainment center, which is commercially available from Microsoft Corporation of Redmond, Wash. Such software can also be used to play television content based on the output of the computer's tuner card.

It is to be appreciated and understood that the exemplary system 100 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Figure 1B:
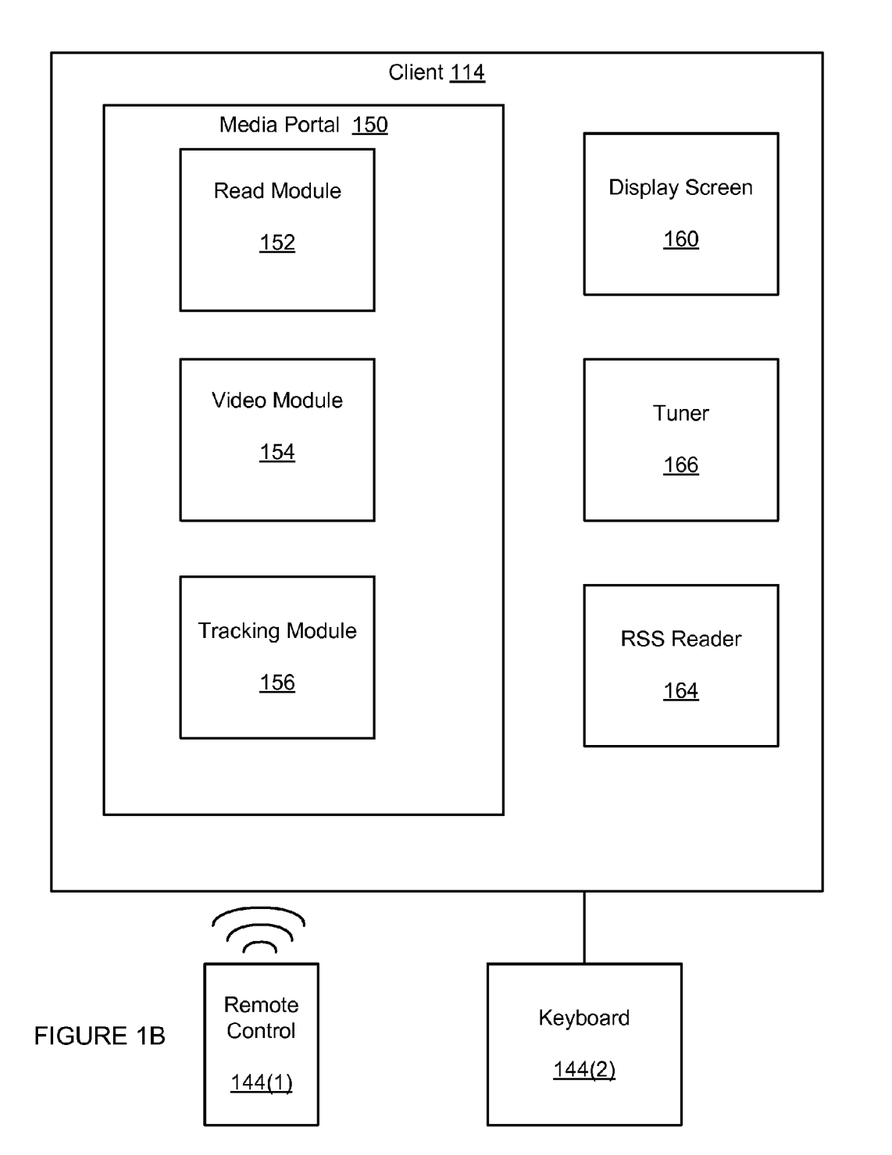
FIG. 1B depicts one embodiment of a client device having a media portal.
Figure 2A:
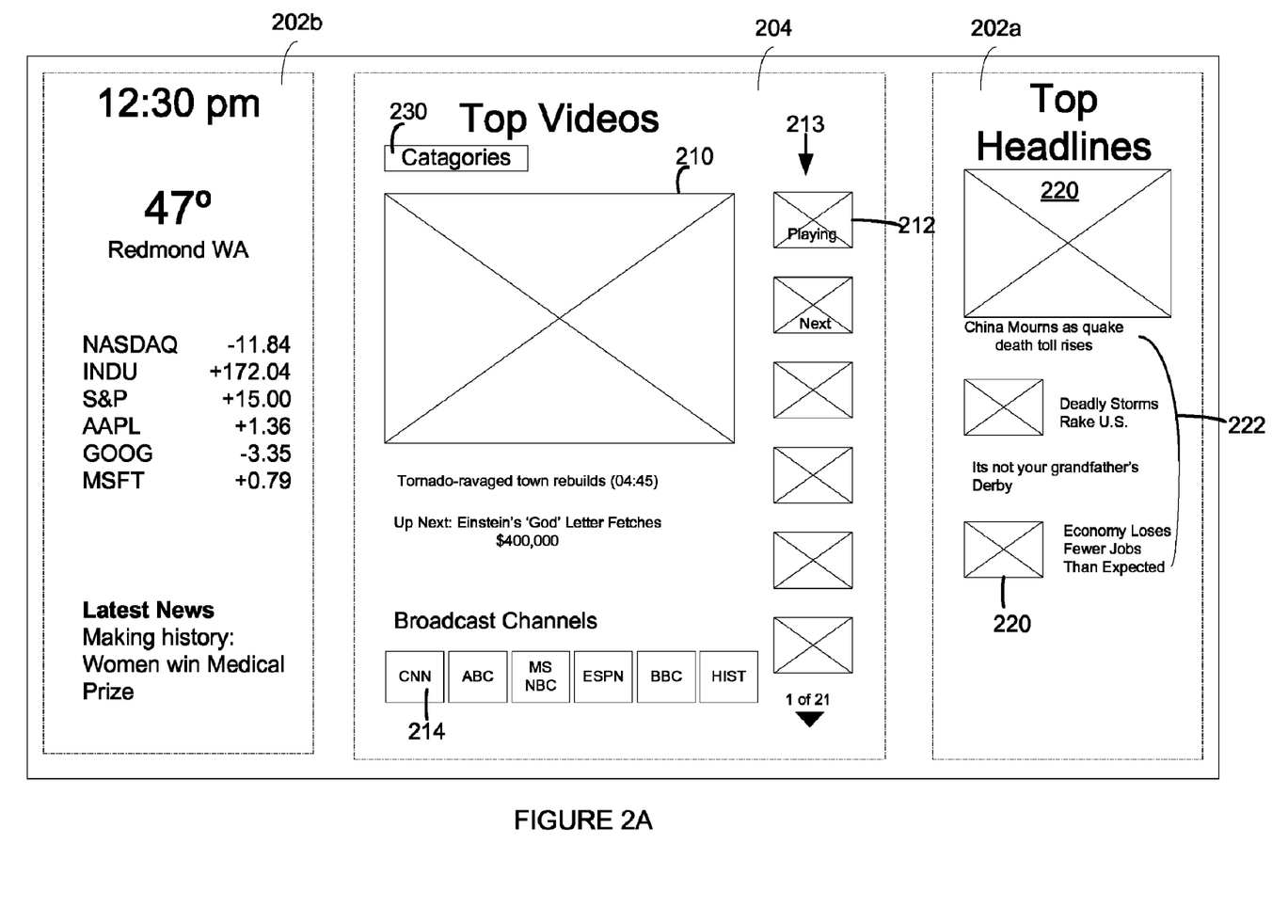
FIG. 2A, FIG. 2B, and FIG. 2C depict content presented on a display screen by one embodiment of a media portal.

FIG. 1B depicts one embodiment of a client device 114 having a media portal 150 that may be implemented as software instructions on the client 114, such as a personal computer. The media portal 150 has three different modules for displaying three different types of content. In this example, there is a read module 152, a video module 154, and a tracking module 156. Each of the modules is for displaying content in either an expanded state or a contracted state on the display screen 191. Referring briefly to FIG. 2A, which depicts content presented on a display screen 160 by one embodiment of the media portal 150, video content is being displayed in an expanded state in the expanded region 204. Content from the read module 152 is being displayed in a contracted state in contracted region 202*a*, and content from the tracking module 156 is being displayed in contracted region 202*b*. The ability for a user to switch the content between expanded and contracted states (e.g., to move content between the expanded region 204 and the contracted regions 202*a*, 202*b*) will be discussed later. In general, the user is allowed to interact with the media portal 150 via a remote control device 144(1), a keyboard 144(2), or other device.

The tracking module 156 tracks data such as real time stock quotes, the current weather, and news headlines from a network such as the Internet. In one embodiment, the tracking module 156 receives RSS feeds to allow it to track data. The tracking module 156 outputs data that is displayed on the display screen 160.

The video module 154 is for displaying video content on the display screen 160. The video module 154 may receive video (e.g., a television broadcast) from a tuner 166. Examples of tuner cards have been previously discussed. In one implementation, the video module 154 receives Internet Protocol Television (IPTV) from a network 120, such as the Internet. The video module 154 can also receive streaming video from a network 120, such as the Internet. For example, the video module 154 can receive short video clips.

In one aspect, the read module 152 receives news articles from a network 120 such as the Internet. The content displayed by the read module 152 can include images such as a picture associated with a news article.

The client device 114 has an RSS reader 164, which subscribes to RSS feeds and provides the updated information from the RSS feeds to one or more of the modules 152, 154, 156. RSS is a family of Web feed formats used to publish frequently updated works, such as news headlines, stock quotes, etc. An RSS document may include full or summarized text, plus metadata such as publishing dates and authorship. In one embodiment, the user is allowed to subscribe to RSS feeds through the media portal 150. The RSS reader 164 checks the user's subscribed feeds regularly for updates, downloads the updates, and provides the updates to the appropriate module 152, 154, 156.

Referring again to FIG. 2A, the center region is a focus or expanded region 204, whereas the two outer regions are contracted regions 202*a*, 202*b*. The expanded region 204 typically contains the content that the user is currently the most interested in. However, the user is still able to monitor the other two regions 202*a*, 202*b* and can easily move the content from one of the contracted regions 202 to the expanded region 204 (where the content is expanded). Note that there may be more or fewer than three different regions.

The viewport 210 can be used to play either a selected broadcast channel or one of the streaming video clips. For example, the user may select one of the broadcast channel icons 214 to cause the selected broadcast channel to be played in viewport 210. The user may select one of the streaming video thumbnails 212 in a video queue 213 to cause a streaming video to be played in the viewport 210. Currently, the user is watching one of the streaming videos as evidenced by the "playing" overlay on the thumbnail 212 at the top of the video queue 213. In one implementation, after the current video finishes, the next video in the video queue 213 automatically starts to play.

Contracted region 202*a* currently displays content related to headline news from the read module 152. Each headline in the articles list 222 allows the user to determine whether they desire to read the associated news article. Some of the news articles have an image 220 such as a photograph related to the article. However, it is not required that any images be displayed. In this implementation, the text of the news articles is not displayed in contracted region 202*a*. However, a brief portion of the news article could be displayed in the contracted region 202*a*. As one example, if there is no image for the top article, then a portion of the news article could be displayed in the region where the image would otherwise be displayed. In this case, the headline "China mourns as quake death toll rises" might be displayed over top of the portion of the news article or might not be displayed at all.

Region 202b currently contains information being tracked including the current time, current weather for the user's location, the latest stock quotes of interest to the user, and breaking news. The user is allowed to personalize what information is displayed in this region 202b. Moreover, the user can select this region 202b to obtain more detailed information (which itself can be personalized). Note that the user can continue to watch the video (possibly in a reduced size version) after selecting region 202b to obtain more detailed information.

The tracking, video, and news content are for purposes of illustration. In this implementation, the media portal 150 may be especially effective for news consumers. However, the media portal 150 can be used for other types of content. Note that there may be more or fewer than three different types of content.

Figure 2B:
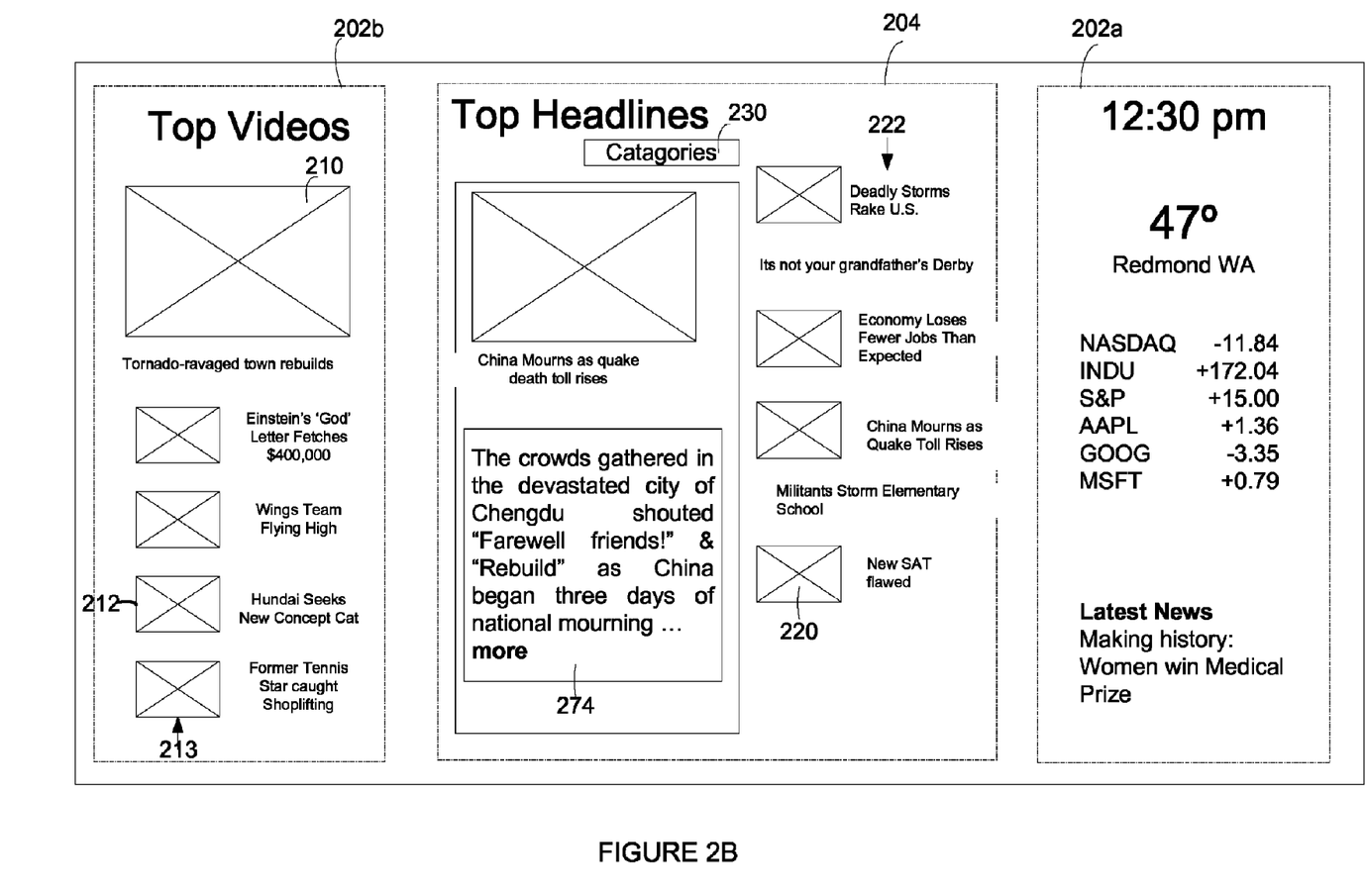
Figure 2C:
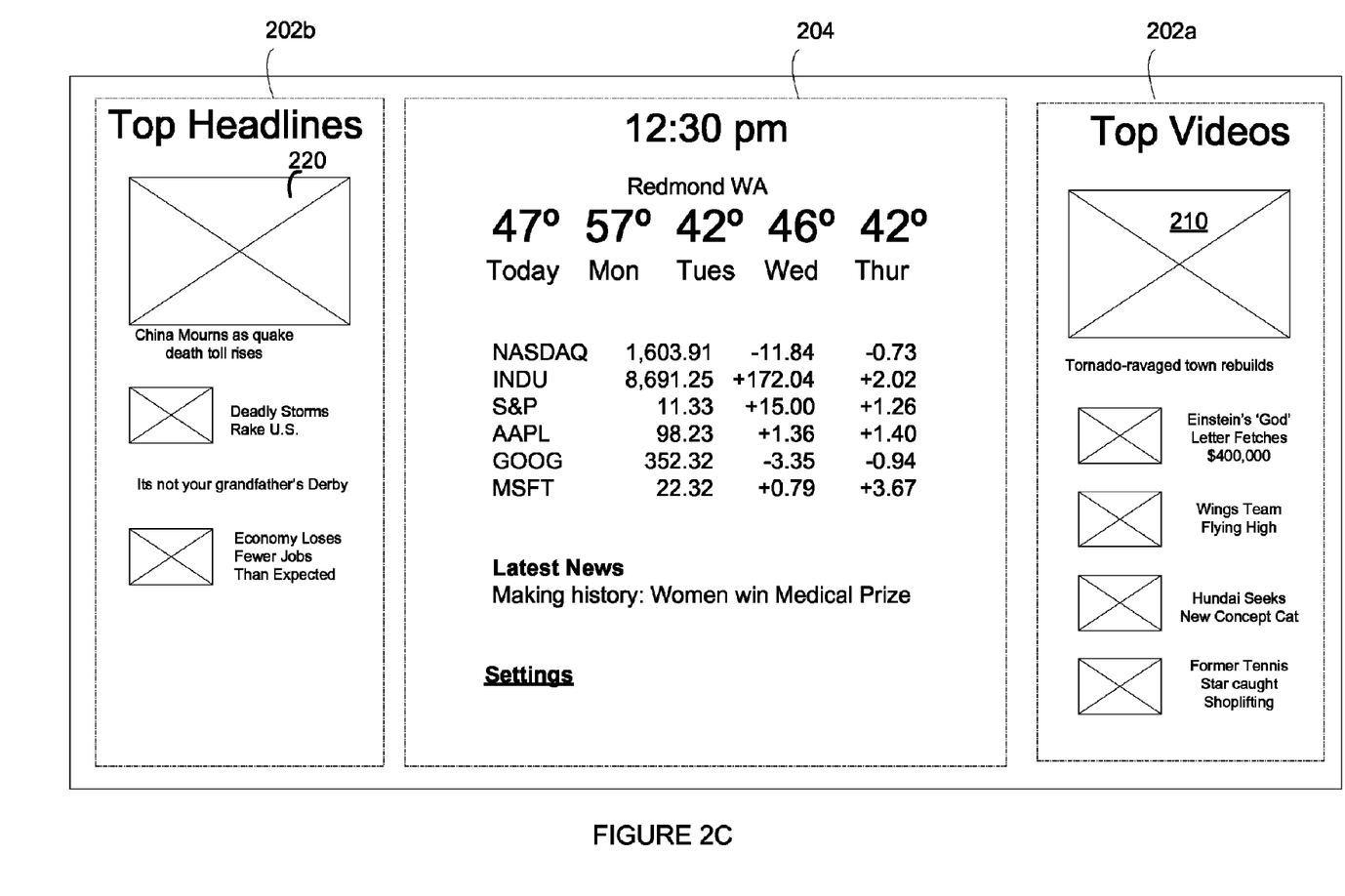

In one implementation, the user is allowed to scroll through the different types of content such that each type of content can be featured in the expanded region 204. For example, referring briefly to FIG. 2B, the news headlines have been moved to the left and are now in the expanded region 204, the videos have been "scrolled" to the left and are now in the contracted region 202b to the left, the tracking has been "scrolled" around such that it is now in the contracted region 202a on the right. Referring briefly to FIG. 2C, the tracking has now been moved to the expanded region 204, the headlines are to the left contracted region 202b, and the videos are to the right contracted region 202a. Note that the expanded region 204 is substantially larger than either of the minimize regions 202. Therefore, appropriate accommodations are made to move the content. In one implementation, the user causes the content to move by using "arrow" keys on a remote control device and pressing an "enter" button or the like. However, the arrow keys (and an enter key) on a keyboard could be used. As another alternative, a "mouse" device can be used to move a cursor over a region. Then, the user can "right click" or "left click" with the mouse to select the region. Still other devices can be used to move the content. Further details of FIG. 2A-FIG. 2C will be discussed below.

Note that it is not a requirement that the expanded region 204 always be in the middle of the screen 160. For example, instead of moving the top headlines from contracted region 202a in FIG. 2A to contracted region 204 in FIG. 2B, contracted region 202a can be expanded to the left and expanded region 204 can be contacted. Thus, the top headlines would be displayed in an expanded state on the right half of the screen. Note that this is equivalent to a shift in the expanded region 204.

Figure 3:
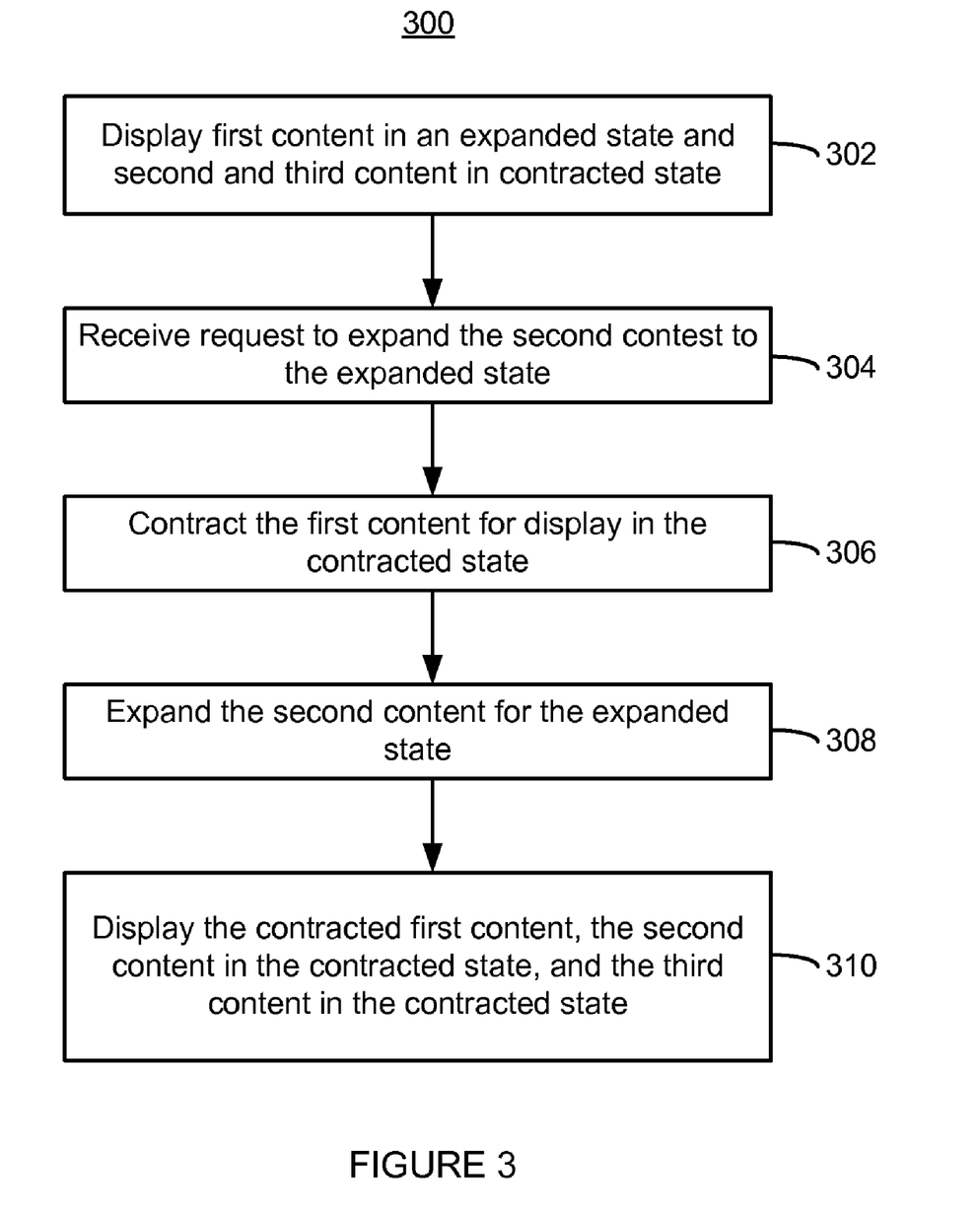
FIG. 3 is a flowchart illustrating steps of a process of displaying media content.

FIG. 3 is a flowchart illustrating steps of a process 300 of displaying media content. Process 300 may be implemented by executing instructions, which are stored on a computer readable storage medium, on a processor. The instructions may be a part of the media portal 150. In one embodiment, process 300 is implemented by client 114. The client 114 may be a personal computer, but could be another device. Process 300 will be described with reference to FIG. 2A-FIG. 2C for convenience of discussion. However, it will be understood that process 300 is not limited to this example.

In step 302, first content is displayed in an expanded state while second and third content is displayed in respective contracted states. For example, video content is displayed in an expanded state in the expanded region 204 while headline news is displayed in a contracted state in contracted region 202a and tracking content is displayed in a contracted state in contracted region 202b.

In step 304, a request is received to expand the second content to the expanded state. In one embodiment, this is a request to move the second content to the expanded region 204. For example, the user presses an arrow key on a remote control 144(1) until the news content is highlighted. Once the news content is highlighted the user presses an "enter" key on the remote control 144(1) to request that the news headlines be moved to the expanded region 204. Note that it is not required that the user input be made through a remote control 144(1). Another alternative for the user input device is a computer keyboard 144(2). For example, the user can press "arrow" keys and an "enter" key on the keyboard. Still other devices can be used as the input device.

In step 306, the first content is contracted. For example, it is re-formatted such that it will fit within one of the contracted regions 202. As an example, the size of the viewport 210 is reduced. As another example, either some (or all) of the broadcast icons 214 are eliminated or some (or all) of the streaming video thumbnails 212 are eliminated. FIG. 2B depicts the video content now being displayed in contracted region 202a. In that example, there is now a smaller version of the viewport 210. The thumbnails 212 in the video queue 213 remain, but there are no broadcast icons 214. However, broadcast icons 214 may be displayed in the contracted state.

In step 308, the second content is expanded. For example, it is re-formatted such that it will make use of the expanded region 204. As an example, the news content is reformatted from the version seen in FIG. 2A to the one depicted in FIG. 2B. Specifically, text of the selected article is now viewable in the news reader 274. Also, additional news headlines may be available in the article list 222.

In step 310, the contracted first content is displayed in one of the contracted regions 202a or 202b while the expanded second content is displayed in the expanded region 204 and while the third content is displayed in one of the contracted regions 202a or 202b. Again, note that the regions 202a, 202b, 204 do not have to remain fixed. However, in one embodiment, the regions 202a, 202b, 204 themselves stay fixed with the content therein changing.

Referring to FIG. 2B, the video content is now displayed in the left contracted region 202b, the news content is now displayed in the expanded region 204, and the tracking content is displayed in the right contracted region 202a. Thus, in this example, the content is "scrolled" such that news articles and video move to the left and the tracking "scrolls around" to the right. Note that this scrolling behavior is not a requirement. As an alternative, the tracking might remain in place in contracted region 202b with the video content moving from the expanded region 204 (in FIG. 2A) to contracted region 202a on the right.

Referring again to FIG. 2A, the following are details of displaying the video content in the expanded state. Because the user is presently watching a video from the video queue 213 of top ranked videos, the header "Top Videos" is displayed. If the user was watching a broadcast channel, then a header such as "Broadcast Channels" or the specific channel such as "MSNBC" would be displayed.

If the user selects the categories button 230, different video categories are displayed. For example, a drop down list including selections such as top videos, U.S. news, my playlist, world news, politics, sports, and business is displayed near the categories button 230. If, for example, the user selects the item "U.S. News," then the video queue 213 changes from top videos to U.S. news videos. The header "Top Videos" also changes to "U.S. News."

In one implementation, the user is able to add videos from the video queue 213 to their playlist. For example, first the user causes one of the thumbnails 212 to be highlighted by using up, down, right, and left arrow keys of the remote control. Specifically, if the viewport 210 is currently highlighted, the user presses the right arrow key to cause the top thumbnail 212 to be displayed and then may press the down arrow key to go down the video queue 213. Once the desired thumbnail 212 is highlighted, the user presses a key such as "enter" on the remote, which causes a drop down "action menu" to be displayed next to the thumbnail 212. The drop down action menu has a "watch" option and an "add to my playlist" option. The user selects the watch item to cause that video to be played in the viewport 210 and the "add to my playlist" item to add the item to their playlist.

The following table provides additional details of actions that occur when a user presses various keys when interacting with the media portal 150 when the video content is currently in the expanded state. Each of the actions is based on a current condition. For example, if the viewport 210 is currently highlighted and the user presses OK, then a full screen video mode is entered in which the video occupies even more of the display screen than in the expanded state. For example, the tracking information is removed to provide more room for the viewport 210.

| Key Press | Condition | Action | Target Screen/State |
|---|---|---|---|
| OK/Enter | If highlighting viewport | Plays video full-screen | Full-screen video is displayed |
| | If highlighting Categories button | Displays Categories overlay | Current category highlighted |
| | If highlighting Broadcast icon | Displays broadcast channel in viewport and main header changes to 'Broadcast' | Broadcast icon is highlighted and broadcast channel is displayed in viewport. |
| | If highlighting video thumbnail in queue | Displays action menu | Currently-playing video thumbnail is highlighted |
| Right Arrow | If highlighting viewport | Moves highlight to currently-playing video thumbnail | Currently-playing video thumbnail is highlighted |
| | If highlighting Categories button | Inactive | N/A |
| | If highlighting Broadcast icon | Moves highlight to icon on the right | Icon is highlighted |
| | If highlighting Broadcast icon (last in row) | Moves 'Read' module into center focus | 'Read' module is in center focus and story is highlighted |
| | If highlighting video thumbnail in queue | 'Read' module is in center focus and story is highlighted | 'Read' module is in center focus and story is highlighted |
| Left Arrow | If highlighting viewport | Moves 'Track' module into center focus | 'Track' module is in center focus and Weather section is highlighted |
| | If highlighting 'Categories' button | Inactive | N/A |
| | If highlighting Broadcast icon | Moves highlight to icon to the left | Icon is highlighted |
| | If highlighting Broadcast icon (last in row) | Moves 'Track' module into center focus | 'Track' module is in center focus and Weather section is highlighted |
| | If highlighting video thumbnail in queue | Moves highlight to viewport | Viewport is highlighted |
| Up Arrow | If highlighting viewport | Moves highlight to Categories button | Categories button is highlighted |
| | If highlighting 'Categories' button | Inactive | N/A |
| | If highlighting Broadcast icon | Moves highlight to viewport | Viewport is highlighted |
| | If highlighting video thumbnail in queue | Moves highlight up video queue | Moves highlight up queue |
| Down Arrow | If highlighting viewport | Moves highlight to first Broadcast icon in row | Broadcast icon is highlighted |
| | If highlighting 'Categories' button | Moves highlight to viewport | Viewport is highlighted |
| | If highlighting Broadcast icon | Inactive | N/A |
| | If highlighting video thumbnail in queue | Moves highlight down video queue | Moves highlight down queue |
| Back | If on news portal home screen | Exits news portal and takes user to Media Center home screen | Media Center home screen |

Referring again to FIG. 2B, the following are details when the news article content is in the expanded region 204. As with the video content, the user is allowed to select between different categories of news. Because the user is presently reading an article from the "top headlines" queue, the header "Top Headlines" is displayed. If the user selects the categories button 230, different news article categories are displayed. For example, a drop down list including selections such as top videos, U.S. News, World news, politics, sports, and business is displayed. If, for example, the user selects the item "U.S.

News", then the article list changes from top headlines to U.S. news articles. The header "Top headlines" also changes. The drop down list of categories may or may not cover the currently displayed article. For example, if there is an image to be displayed, the drop down list may be confined to only cover the image such that the article is not obscured. However, if there is not an image then the category menu might cover part of the article.

Figure 4:
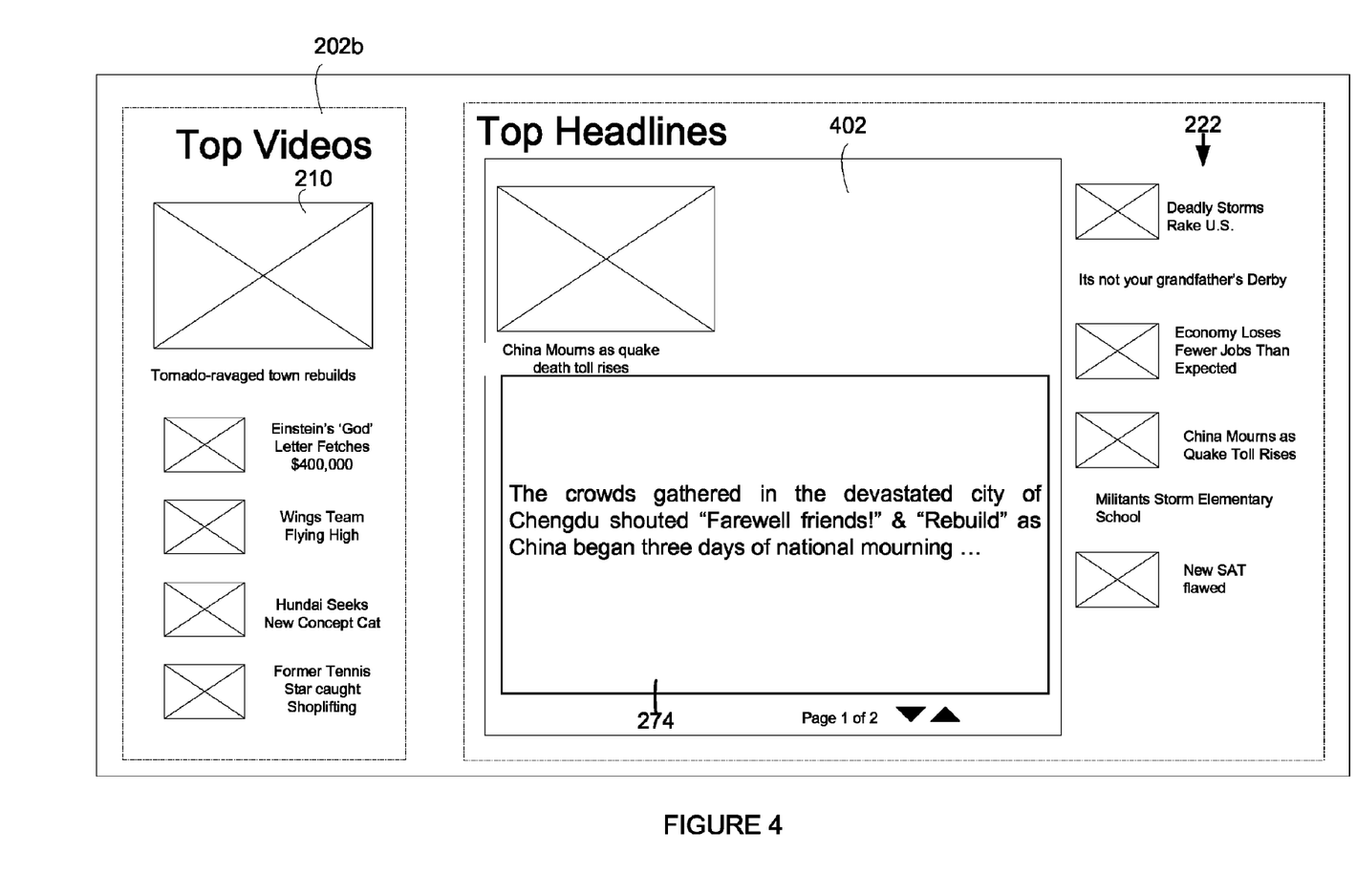
FIG. 4 depicts content presented on a display screen by one embodiment of a media portal.

The following table provides additional details of actions that occur when a user presses various keys when interacting with the media portal 150 when the content from the read module 152 is currently in the expanded region 204. Each of the actions is based on a current condition. For example, if the text reader 274 is currently highlighted and the user presses OK, then a fuller screen text mode is entered in which the text occupies even more of the display screen than in the expanded mode. FIG. 4 depicts one embodiment of fuller-screen text mode having an enlarged text region 402.

a stock index and a percentage change for the day is also depicted. The stock quotes can also be expanded to list additional stocks.

The latest news cycles through different headlines. The headlines may be taken from the same source as those used to generate the headlines for the news article content.

By selecting the settings button, the user is allowed to customize settings for the tracking module 156. For example, the user is allowed to customize the stock list or location for the weather report.

The following table provides additional details of actions that occur when a user presses various keys when interacting with the media portal 150 when the content of the tracking module 156 is currently in the expanded region 204. Each of the actions is based on a current condition. For example, if the settings label is currently highlighted and the user presses OK, then a settings screen is displayed. Note that if the up

| Key Press | Condition | Action | Target Screen/State |
|---|---|---|---|
| OK/Enter | If highlighting text reader | Expands to fuller-screen text mode | fuller-screen text is displayed |
|  | If highlighting Categories button | Displays Categories overlay | Categories overlay in focus; current category highlighted |
|  | If highlighting headline in list | Displays new story preview and moves highlight to story preview | Story preview is highlighted |
| Right Arrow | If highlighting text reader | Moves highlight to first Headline (matching the current story | Headline is highlighted |
|  | If highlighting 'Categories' button | Inactive | N/A |
|  | If highlighting headline in list | Moves 'Track' module into center focus | Weather section is highlighted |
| Left Arrow | If highlighting text reader | Moves 'Video' module into center focus | Viewport is highlighted |
|  | If highlighting 'Categories' button | Inactive | N/A |
|  | If highlighting headline in list | Moves highlight to story preview | Story preview is highlighted |
| Up Arrow | If highlighting text reader | Moves highlight to 'Categories' button | Categories' button is highlighted |
|  | If highlighting 'Categories' button | Inactive | N/A |
|  | If highlighting headline in list | Moves highlight up the list | Moves highlight up the list |
| Down Arrow | If highlighting text reader | Inactive | N/A |
|  | If highlighting 'Categories' button | Moves highlight to story preview | Story preview is highlighted |
|  | If highlighting headline in list | Moves highlight down the list | Moves highlight down the list |

Referring again to FIG. 2C, when the tracking is in the expanded region 204, the weather forecast is expanded from one day to five, in this example. The stock quotes are also expanded as follows. In the contracted states, only the daily change in a stock index or stock price is depicted. In the expanded state, the current price for a stock or point total for arrow is selected when the weather section is highlighted this may cause the bottom section (settings) to be highlighted. Alternatively, no action might be taken. Likewise, if the down arrow is selected when the settings window is highlighted, the weather section might be highlighted, or no action might be taken.

| Key Press | Condition | Action | Target Screen/State |
|---|---|---|---|
| OK/Enter | If highlighting Weather section | Inactive | N/A |
|  | If highlighting Stocks section | Inactive | N/A |

-continued

| Key Press | Condition | Action | Target Screen/State |
|---|---|---|---|
| | If highlighting Ticker section | Inactive | N/A |
| | If highlighting Settings button | Displays settings screen | Settings screen is displayed |
| Right Arrow | If highlighting any section | Moves Video module into center focus | Viewport is highlighted |
| Left Arrow | If highlighting any section | Moves 'Read' module into center focus | Story is highlighted |
| Up Arrow | If highlighting read window | Moves highlight to section above | Section above is highlighted |
| Down Arrow | If highlighting read window | Moves highlight to section below | Section below is highlighted |

Figure 5:
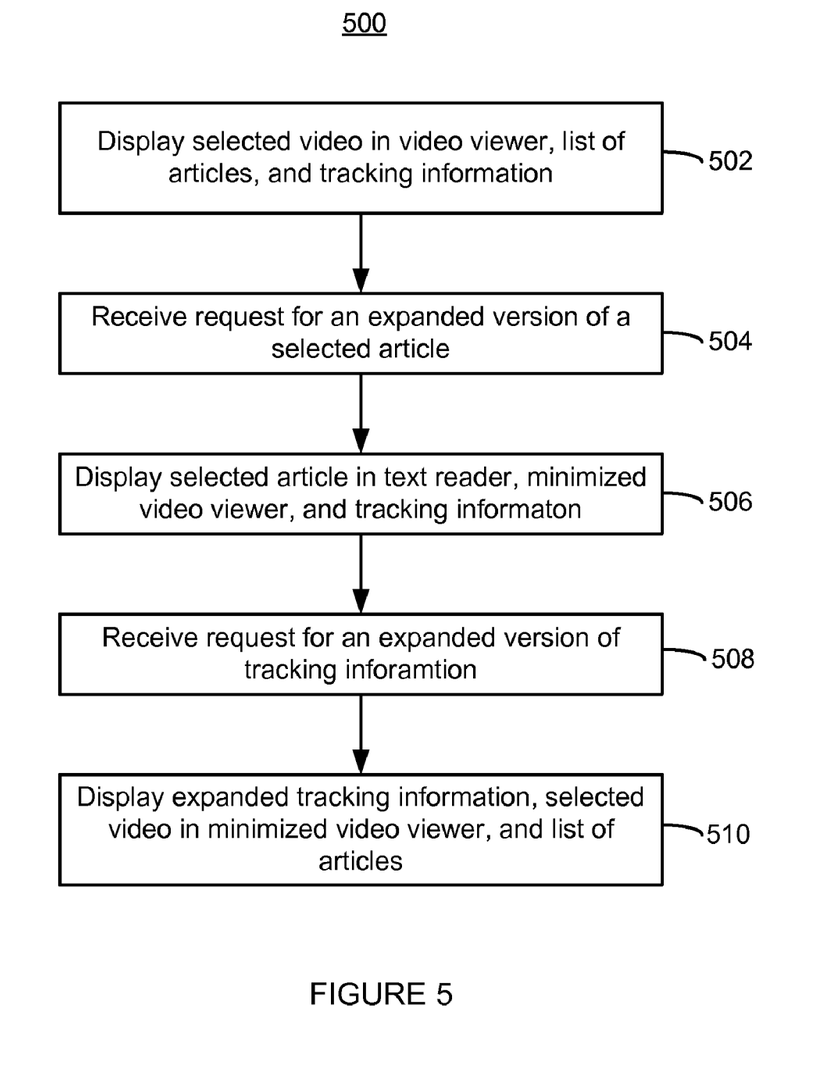
FIG. 5 depicts one embodiment of a process of scrolling the content through different regions.

FIG. 5 depicts one embodiment of a process 500 of scrolling the content through different regions. In one embodiment, to implement process 500 computer readable instructions that are stored on computer readable media are executed on a processor. Process 500 may be executed by client 114. In step 502, selected video content is displayed in a viewport 210 while displaying a list of articles, and tracking information. For example, the screen of FIG. 2A is displayed. The user may select the content by selecting a broadcast icon 214 or a video thumbnail 212. Step 502 is one implementation of step 302 of process 300.

In step 504 a request is received for an expanded version of a selected article. As an example, the user presses the right arrow of the remote control 144(1) until one of the articles in region 202a of FIG. 2A is highlighted. Then, the user may press the down arrow or up arrow to move up and down the article list 222. When a desired article is highlighted, the user presses OK (or enter). Step 504 is one implementation of step 304 of process 300. Note that the user is also allowed to request for an expanded version of the tracking information at this point rather than the selected news article.

In step 506, the selected article is displayed in a text reader 274 while displaying a reduced version of the viewport 210 and tracking information. For example, the screen of FIG. 2B is displayed. Step 506 is one implementation of steps 306-310 of process 300.

In step 508, a request is received for an expanded version of the tracking information. For example, referring to FIG. 2B the user presses the right arrow until one of the sections from the tracking information is highlighted. Then, the user presses OK (or enter). Step 508 is one implementation of step 304 of process 300. Note that the user is also allowed to request for an expanded version of the video at this point rather than the tracking information.

In step 510, an expanded version of the tracking information is displayed while displaying the article list and the reduced version of the viewport. The text reader 274 need not be displayed. For example, the screen of FIG. 2C is displayed. Step 510 is one implementation of steps 306-310 of process 300. After step 510, the user may request for an expanded version of either the video content or news article content.

In one embodiment, the scrolling behavior depends on the direction that the user is scrolling. For example, if the user continues to press the right arrow key when the viewport 210 is in focus, the following sequence occurs: highlight viewport 210, highlight item in video queue 213, move reader 274 to expanded region, highlight articles list 222, and move tracking information to expanded region. On the other hand if the user presses the left arrow the video queue 213 and articles list 222 are skipped to allow for faster scrolling. Thus, the sequence is: highlight viewport 210, move tracking information to expanded region, move reader 274 to expanded region. Note that the behavior of the right arrow and left arrow can be switched.

In one embodiment, the client device 114(4) executes computer readable instructions that are stored on computer readable storage media. The client device 114(4) has a processor on which the instructions are executed. Computer readable storage media can be any available media that can be accessed by the client device 114(4). By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage medium which can be used to store the computer readable instructions and which can accessed by the client device 114(4).

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

Figure 6:
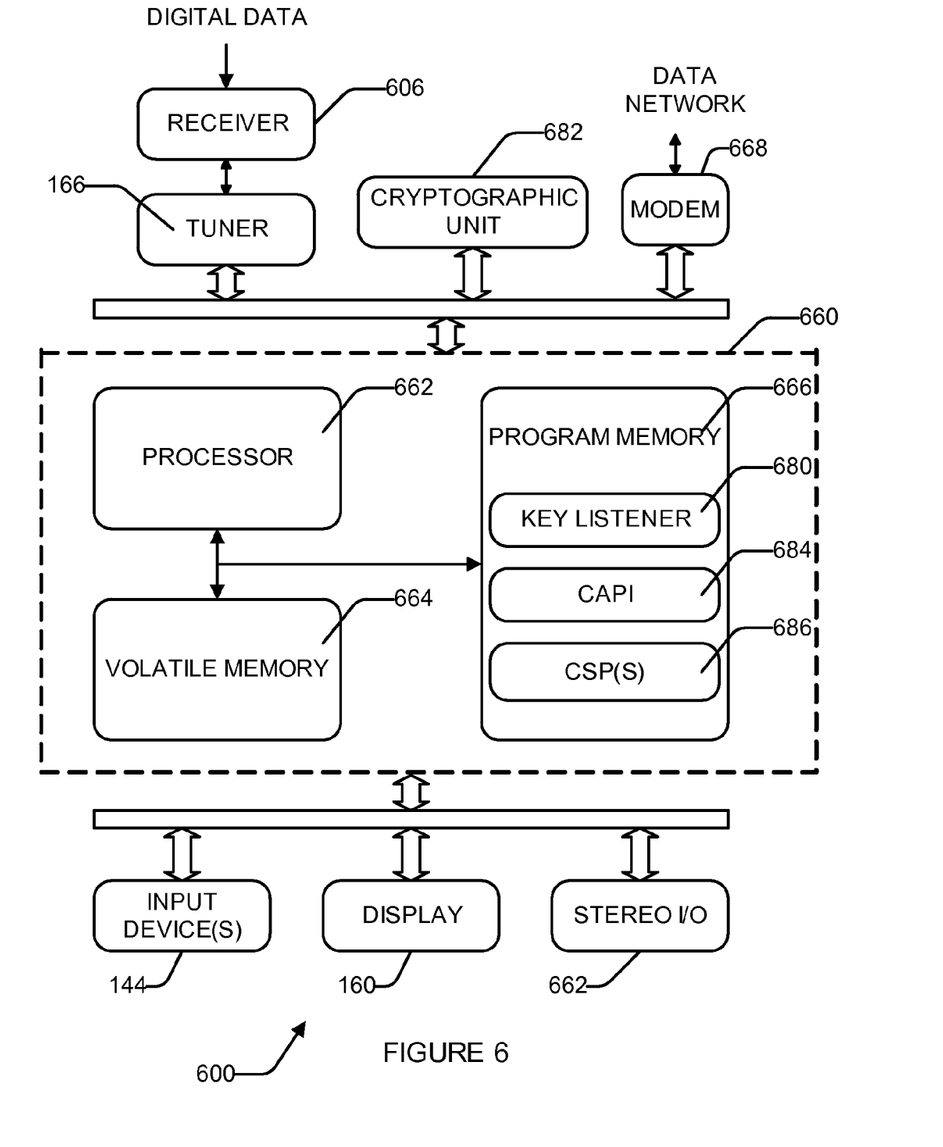
FIG. 6 shows an example configuration of a broadcast-enabled electronic media device that may serve to implement at least a portion of the client.

At least some of the embodiments disclosed herein may be implemented on client 114. FIG. 6 shows an example configuration of a broadcast-enabled electronic media device 600 that may serve to implement at least a portion of the client 114. Device 600 includes a central processing unit 660 having a processor 662, volatile memory 664 (e.g., RAM), and program memory 666 (e.g., ROM, Flash, disk drive, floppy disk drive, CD-ROM, etc.). The device 600 has one or more input devices 144 (e.g., keyboard, mouse, etc.), a video display 160 (e.g., VGA, SVGA), and a stereo I/O 672 for interfacing with a stereo system.

The device 600 includes a digital broadcast receiver 606 (e.g., satellite dish receiver, RF receiver, microwave receiver, multicast listener, etc.) and a tuner 166 which tunes to appropriate frequencies or addresses of the broadcast network. The tuner 166 is configured to receive digital broadcast data in a particularized format, such as MPEG-encoded digital video and audio data, as well as digital data in many different forms, including software programs and programming information in the form of data files. The device 600 also has a modem 678, which provides dial-up access to the data network 628 to provide a back channel or direct link to a server 104. In other implementations of a back channel, the modem 678 might be replaced by a network card, or an RF receiver, or other type of port/receiver that provides access to the back channel.

The device 600 runs an operating system that supports multiple applications. The operating system may be a multi-tasking operating system that allows simultaneous execution of multiple applications. The operating system may employ a graphical user interface windowing environment that presents the applications or documents in specially delineated areas of the display screen called "windows."

The device is illustrated with a key listener 680 to receive the authorization and session keys transmitted from the server 104. The keys received by listener 680 are used by cryptographic security services implemented in a protection mechanism in the client 114 to enable decryption of the session keys and data. Cryptographic services are implemented through a combination of hardware and software. A secure, tamper-resistant hardware unit 682 is provided external to the CPU 660 and two software layers 684, 686 executing on the processor 662 are used to facilitate access to the resources on the cryptographic hardware 682.

The software layers include a cryptographic application program interface (CAPI) 684 that provides functionality to any application seeking cryptographic services (e.g., encryption, decryption, signing, or verification). One or more cryptographic service providers (CSPs) 686 implement the functionality presented by the CAPI to the application. The CAPI layer 684 selects the appropriate CSP for performing the requested cryptographic function. The CSPs 686 perform various cryptographic functions such as encryption key management, encryption/decryption services, hashing routines, digital signing, and authentication tasks in conjunction with the cryptographic unit 682. A different CSP might be configured to handle specific functions, such as encryption, decryption, signing, etc., although a single CSP can be implemented to handle them all. The CSPs 686 can be implemented as dynamic linked libraries (DLLs) that are loaded on demand by the CAPI, and which can then be called by an application through the CAPI 684.

Figure 7:
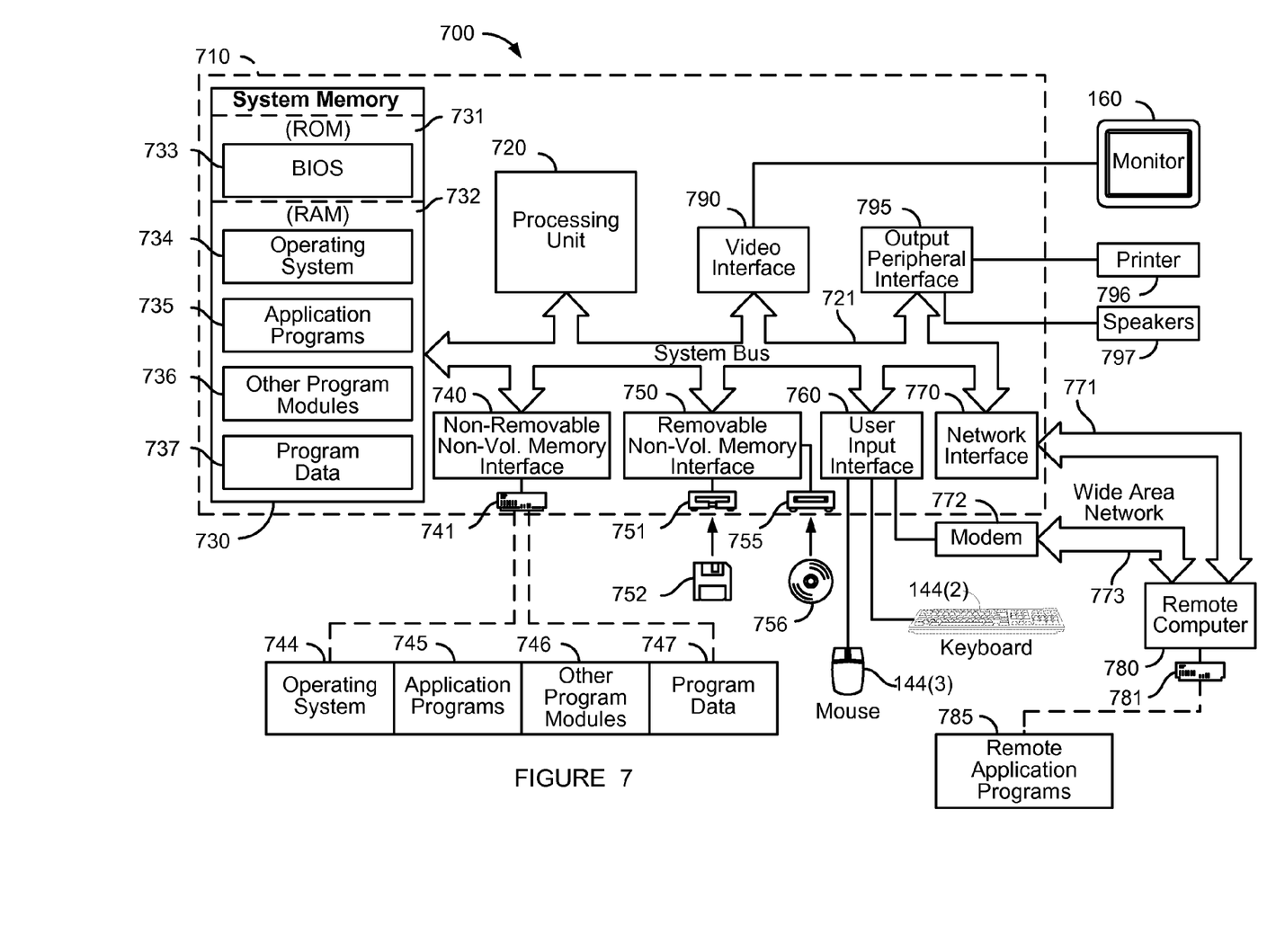
FIG. 7 depicts an example computer system that serves as a platform for embodiments of the present invention.

With reference to FIG. 7, an exemplary system for implementing the inventive system includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

In one embodiment, to implement process 300 and/or process 500 computer readable instructions that are stored on computer readable media are executed on a processor. Computer 710 may include a variety of computer readable media. Computer readable media can be any available media that can be accessed by computer 710 and includes both volatile and nonvolatile media, removable and non-removable media. Combinations of any of the above are also included within the scope of computer readable media.

The system memory 730 includes computer storage media in the form of volatile and/or nonvolatile memory such as ROM 731 and RAM 732. A basic input/output system (BIOS) 733, containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disc drive 741 that reads from or writes to non-removable, nonvolatile magnetic media and a magnetic disc drive 751 that reads from or writes to a removable, nonvolatile magnetic disc 752. Computer 710 may further include an optical media reading device 755 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 741 is typically connected to the system bus 721 through a non-removable memory interface such as interface 740. Magnetic disc drive 751 and optical media reading device 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disc drive 741 is illustrated as storing operating system 744, application programs 745, other program modules 746, and program data 747. These components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 144(2) and a pointing device 144(3), commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 160 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communication over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method comprising:
   displaying first content in an expanded state for the first content and second content in a contracted state for the second content, at least a portion of the first content is presented in a viewport, when in the expanded state for the first content, the first content includes a first list that includes items for selecting streaming videos and a second list that includes items for selecting broadcast channels, displaying the second content in the contracted state for the second content includes displaying a third list that includes items for selecting articles;
   switching between playing a streaming video and a broadcast channel in the viewport in response to receiving a single click request of one of the items from the first list or one of the items from the second list;
   receiving a request to expand the second content;
   contracting the first content for display in a contracted state for the first content in response to the request;
   expanding the second content for display in an expanded state for the second content in response to the request, the expanding the second content for the expanded state for the second content includes displaying a fourth list that includes items for selecting articles and text of one of the articles from the fourth list in a text reader, the text reader is not displayed in the contracted state for the second content; and
   displaying the first content in the contracted state for the first content while displaying the second content in the expanded state for the second content.

2. A computer implemented method as recited in claim 1, wherein the contracting the first content for display in the contracted state includes reducing the size of the viewport but continuing to play at least a portion of the first content in the viewport.

3. A computer implemented method as recited in claim 1, further comprising:
   displaying third content in a contracted state for the third content while displaying the first content in the expanded state for the first content and the second content in the contracted state for the second content, the third content tracks information in real time.

4. A computer implemented method as recited in claim 3, wherein the displaying third content in a contracted state for the third content while displaying the first content in the expanded state for the first content and the second content in the contracted state for the second content includes displaying the third content to the left of the first content and the second content to the right of the first content.

5. A computer implemented method as recited in claim 4, further comprising
   displaying the first content in the contracted state for the first content while displaying the second content in the contracted state for the second content while displaying the third content in an expanded state for the third content.

6. A computer implemented method as recited in claim 1, further comprising:
   receiving a request to subscribe to an RSS (Really Simple Syndication) feed, the request coming via a remote control device.

7. A computer storage device having stored thereon instructions which, when executed on a processor, cause the processor to:
   display a selected video in a viewport in a first physical region of a display that serves as an expanded region, display a list of broadcast channels for selection for the viewport when in the expanded region in the first physical region, display a list of streaming videos for selection for the viewport when in the expanded region in the first physical region;
   display a list of articles in a second physical region of the display that serves as a first contracted region while displaying the selected video in the viewport in the first physical region;
   display tracking information that tracks weather and stocks in real time in a third physical region of the display that serves as a second contracted region while displaying the selected video in the viewport and while displaying the list of articles in the first contracted region;
   receive a first request to display a selected article of the articles in the expanded region in the first physical region of the display;
   display at least a portion of the selected article in a text reader in the expanded region in the first physical region of the display in response to the first request, display a reduced size version of the viewport in the second contracted region in the third physical region of the display, display a list of streaming videos in the second contracted region in the third physical region of the display, and remove the list of broadcast channels in response to the first request, and display the tracking information in real time in the first contracted region in the second physical region in response to the first request; and
   receive a second request to display the tracking information in the expanded region in the first physical region of the display, and in response to the second request display a list of articles in the second contracted region in the third physical region of the display without the text reader while displaying the reduced size version of the viewport in the first contracted region in the second physical region while displaying the tracking information in the expanded region in the first physical region of the display, the reduced size version of the viewport continues to play the selected video.

8. A computer storage device as recited in claim 7, wherein the instructions which, when executed on the processor, cause the processor to display the tracking information in a region that is larger than the third region, cause the processor to display the list of articles without displaying the text reader in the second region while displaying the reduced size version of the viewport in the third region while displaying the expanded version of the tracking information in the first region.

9. A computer storage device as recited in claim 7, further comprising instructions which, when executed on the processor, cause the processor to:
   provide a selection of a plurality of streaming videos and a selection of a plurality of broadcast station feeds; and
   display a selected streaming video or a selected broadcast station in the viewport.

10. A computer implemented method comprising:
   displaying video content, text articles, and tracking information in separate regions of a display screen, one of the regions is an expanded region and two of the regions are contracted regions, the expanded region is displayed between the two contracted regions, each of the video content, text articles, and tracking information have an expanded state and a contracted state;
   receiving one or more requests to move the video content, text articles, and tracking information to different ones of the regions; and
   moving the video content, the text articles, and the tracking information to different ones of the regions of the display screen in response to the one or more requests to move the content, each of the video content, the text articles, and the tracking information are displayed in the expanded state when in the expanded region and the contracted state when in one of the contracted regions, the moving including scrolling the video content, the text articles, and the tracking information sequentially through the separate ones of the regions of the display screen in response to the one or more requests, the scrolling including wrapping around the content from one of the contracted regions to the other contracted region, moving the video content, the text articles, and the tracking information includes:
   presenting a viewport showing a video and a first list of video streams that can be presented in the viewport in the contracted state for the video content;
   presenting a larger version of the viewport showing a video, a second list of video streams that can be presented in the viewport, and a list of broadcast channels that can be presented in the viewport in the expanded state for the video content;
   presenting a first list of articles without a text reader in the contracted state for the text articles;
   presenting a second list of articles and a text reader showing text from one of the articles in the second list for the expanded state for the text articles;
   presenting weather information, stock information and a headline for latest news in the contracted state for the tracking information; and
   presenting additional weather information, additional stock information and a headline for latest news in the expanded state for the tracking information.

11. A computer implemented method as recited in claim 10, further comprising receiving user preferences of what information to track.

12. A computer implemented method as recited in claim 10, further comprising receiving a request to subscribe to an RSS (Really Simple Syndication) feed via a remote control.

* * * * *